United States Patent [19]

Hiroshima

[11] Patent Number: 4,779,523

[45] Date of Patent: Oct. 25, 1988

[54] APPARATUS FOR PRODUCING SOYBEAN FLAKES

[75] Inventor: Kunifumi Hiroshima, Kawasaki, Japan

[73] Assignee: Shinmei Seisakusho Co., Ltd., Kanagawa, Japan

[21] Appl. No.: 29,855

[22] Filed: Mar. 24, 1987

[30] Foreign Application Priority Data

Aug. 20, 1986 [JP] Japan .............................. 61-195074

[51] Int. Cl.⁴ ............................................. A47J 37/12
[52] U.S. Cl. ........................................ 99/404; 99/353; 99/355
[58] Field of Search ................ 99/404, 443 C, 353, 99/355, 357; 426/511; 34/64, 66

[56] References Cited

U.S. PATENT DOCUMENTS

| | | | |
|---|---|---|---|
| 284,266 | 9/1883 | Beebe | 34/66 |
| 333,939 | 1/1886 | Foote | 34/66 |
| 3,336,137 | 8/1967 | Hickey | 99/353 |
| 4,561,347 | 12/1985 | Zaitu | 99/404 |
| 4,614,665 | 9/1986 | Furuya et al. | 426/511 |

Primary Examiner—Henry J. Recla
Assistant Examiner—Linda J. Sholl
Attorney, Agent, or Firm—Koda and Androlia

[57] ABSTRACT

An apparatus for producing soybean flakes by cooking raw soybeans and squashing the cooked soybeans into flakes. Saturated steam from a boiler is passed through a superheater to form superheated steam and this superheated steam is led into a pressure cooker. The raw soybeans are cooked by superheated steam under pressure in the pressure cooker while they are carried on conveyors, and in the course of this cooking, the toxic substances contained in the raw soybeans are deactivated and also the smell of soybean is eliminated. The cooked soybeans are squashed into flakes by a roll mill and dried and cooled in a dryer/cooler unit.

1 Claim, 8 Drawing Sheets

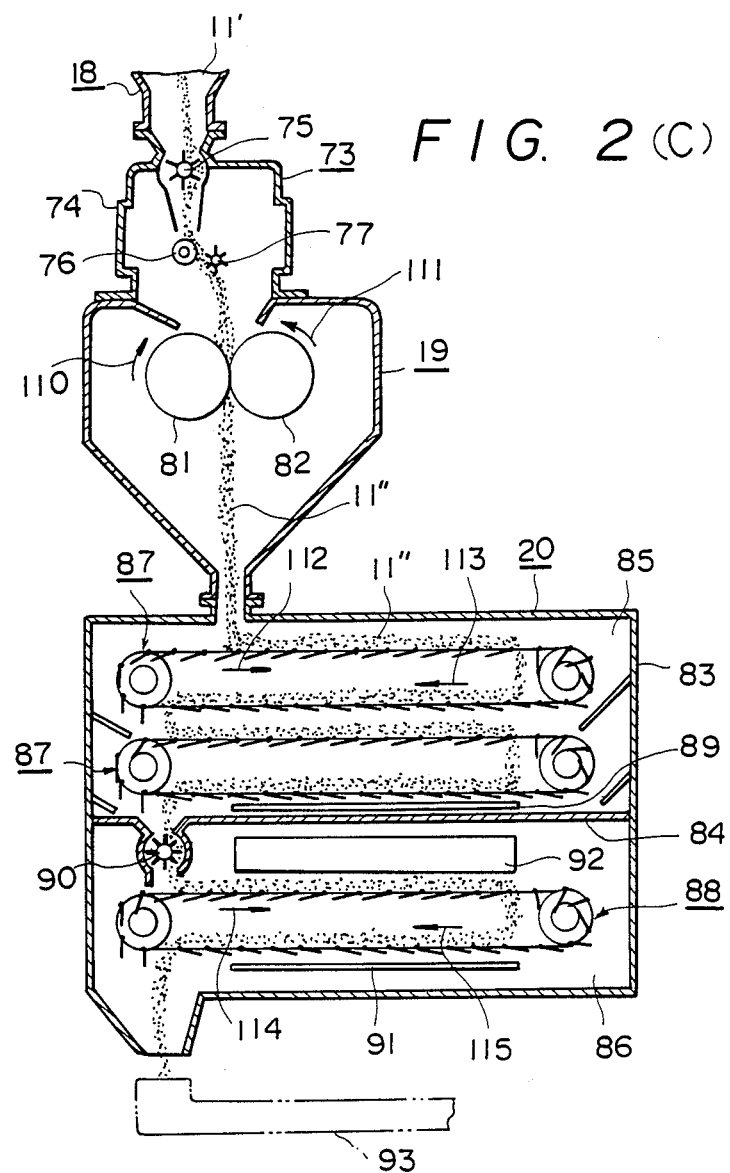

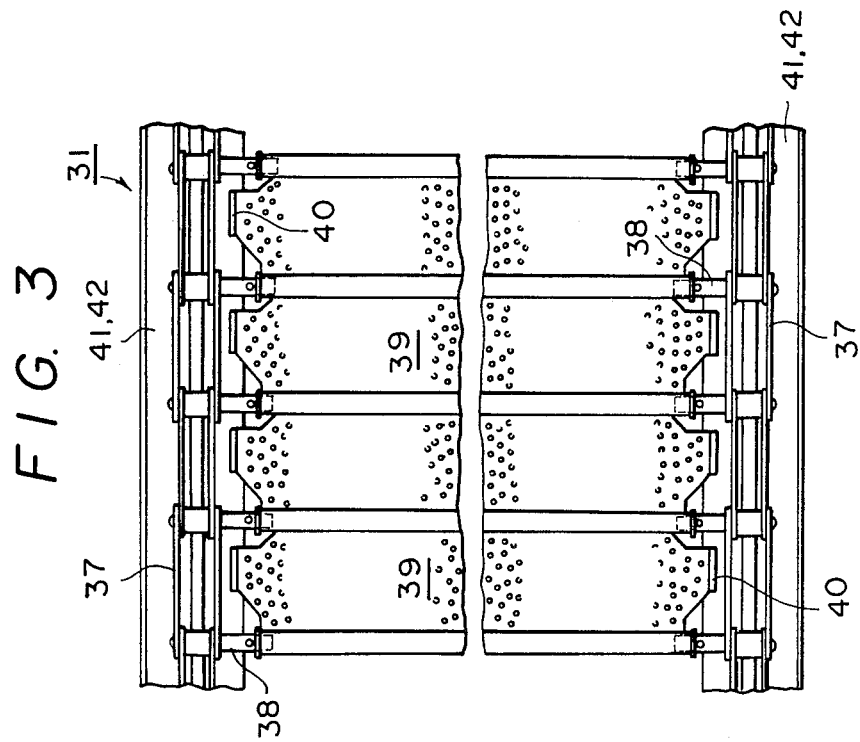

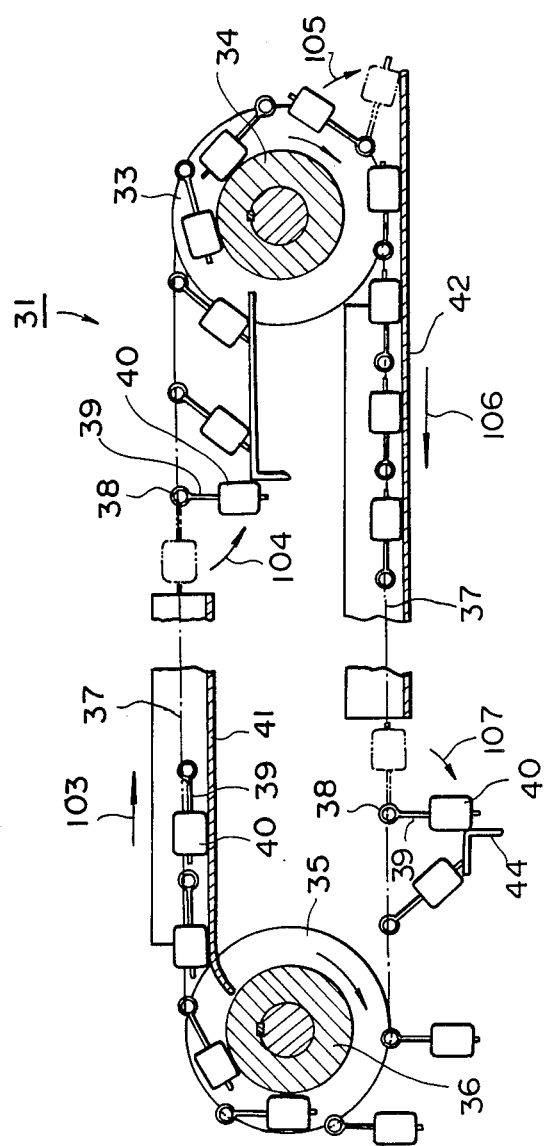

APPARATUS FOR PRODUCING SOYBEAN FLAKES

BACKGROUND OF THE INVENTION

The present invention relates to an apparatus for producing flakes of cereals, especially soybeans, which can not only be offered as stock feed but are also fit for food. More particularly, the invention relates to an apparatus for producing high-quality soybean flakes by eliminating the toxic substances contained in raw soybeans as well as their peculiar smell by cooking them with superheated steam under pressure.

As is generally known, in the preparation of assorted feed for livestock such as cattle, swines, etc., the materials used therefor are subjected to various types of processing so that they are fit for the intended purpose. Especially, in the case of unprocessed starch of cereals such as wheat, corn, etc., since such starch has the problem in digestion, it is processed into alpha starch to enhance digestiveness. Also, in order to elevate the utilization of protein, such cereals are squashed into flakes by a roll mill. Among the cereals, raw soybean is hard and resistant to the enzymatic action as protein contained therein is not thermally denatured. Also, raw soybean contains toxic substances such as trypsin inhibitor and also has its peculiar smell, so that it is unfit for food.

These demerits of raw soybean, however, can be elevated by a wet heat treatment.

Therefore, in use of raw soybeans for food, it has been generally practiced to heat and moisten them with saturated steam under pressure, squash them into flakes by a roll mill and then dry and cool the flakes.

However, the conventional apparatus for producing such flakes by making use of saturated steam had the problem that when the cooking temperature was elevated for eliminating said demerits of raw soybeans, it was necessarily required to raise the working temperature in the pressure cooker, and as a result, the water content of the raw soybeans being treated would increase to cause break of sticking of the beans when they were sqaushed by the roll mill, makinbK it unable to obtain the high-quality flakes. Also, since the pressure in the cooker must be raised, the loads to the pressure cooker and its appurtenant elements such as locker valves would be increased to reduce their service life. Further, as a great deal of power must be used for holding the high load in the drying step, there was the problem of poor economy.

In view of these problems of the prior art, the present inventors have made further studies for enabling the production of high-quality soybean flakes by eliminating said demerits of raw soybeans and, as a result, succeeded in achieving the present invention.

SUMMARY OF THE INVENTION

An object of this invention, therefore, is to provide a soybean flake producing apparatus by which it is possible to obtain the fragrant and good-tasting high-quality soybean flakes which are not only usable as stock feed but also fit for food as the toxic substances contained in the raw soybeans are deactivated and also the smell peculiar to the beans is eliminated, and further the water content of the beans is maintained at an optimal level for preventing break, sticking and peel of epidermis of the beans even whey they are squashed by a roll mill.

Another object of this invention is to provide a soybean flake producing apparatus with excellent durability, in which as it was made possible to perform the high-temperature treatment with steam of low pressure, the loads to the pressure cooker and its appurtenant elements such as locker valves are reduced to prolong the service life of these mechanisms.

Still another object of this invention is to provide a soybean flake producing apparatus which is small in power consumption because of reduced load to the dryer/cooler unit and therefore economical in practical operation.

The soybean flake producing apparatus according to this invention comprises essentially an intermediate bin in which the raw soybeans to be treated are charged, a pressure cooker connected to the bottom of said intermediate bin through a constant rotary feeder and an upper locker valve capable of pressure seal, in which cooker the raw soybeans supplied from said intermediate bin through said feeder and locker valve are cooked with superheated steam under pressure while they are carried on transfer conveyors disposed in said cooker, a superheater for forming superheated steam introduced into said pressure cooker for cooking said raw syybeans, a roll mill by which the cooked soybeans are squashed into flakes, said roll mill being connected to the bottom of said pressure cooker through a lower locker valve capable of pressure seal, and a dryer/cooler unit connected to said roll mill, in which the soybean flakes are dried and cooled.

These and other objects and advantages of this invention will become more apparent as the invention is described more particularly hereinbelow with reference to the accompanying drawings.

BRIEF DESCRIPTION OF THE DRAWINGS

FIG. 3 is a plane view of a slat chain conveyor with parts cut out.

FIG. 4 is a partly omitted illustration of a slat chain conveyor in operation.

DETAILED DESCRIPTION OF THE INVENTION

Figure 1:
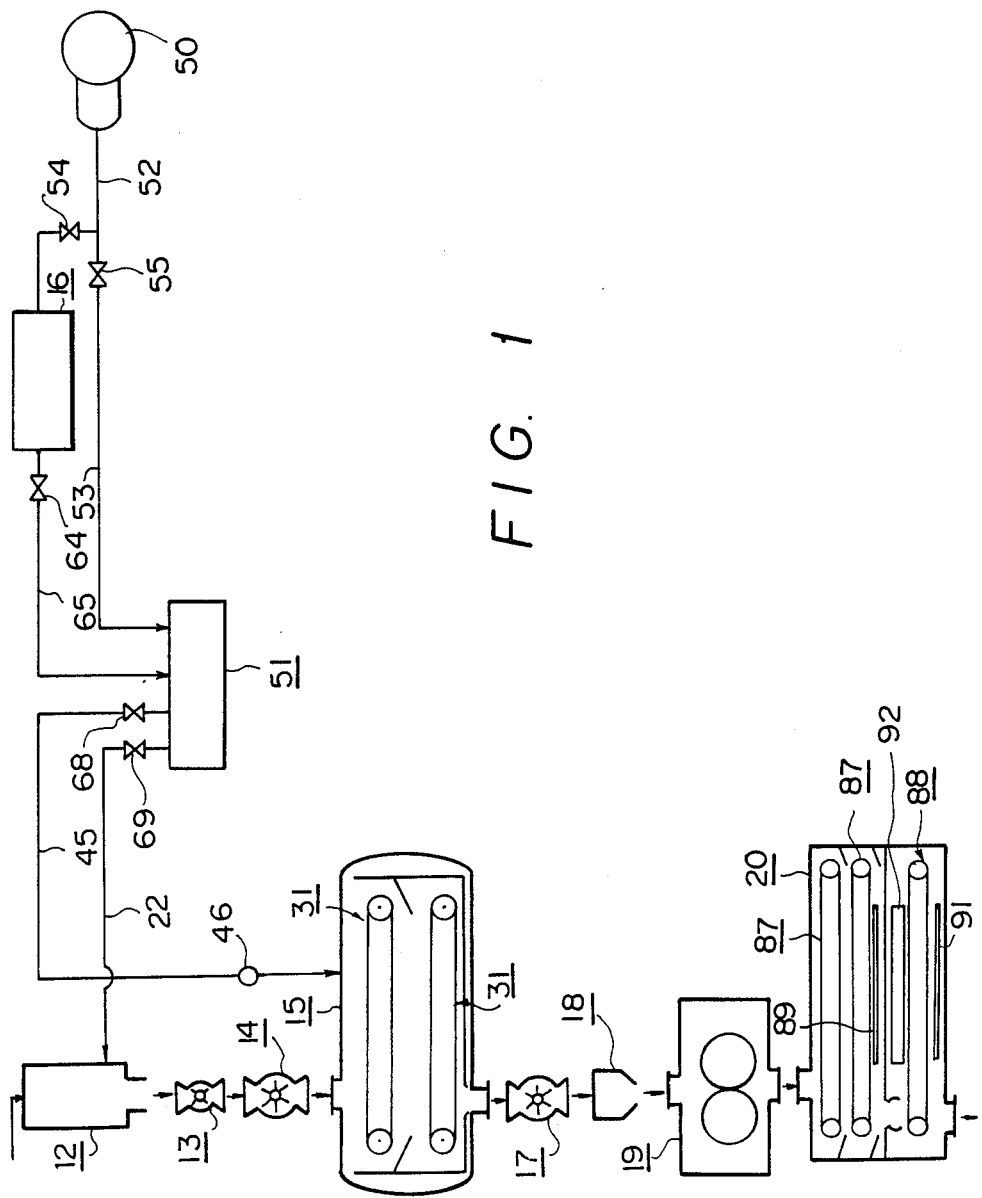
FIG. 1 is a flow sheet showing an example of the soybean flake producing apparatus according to the present invention.

Referring to FIG. 1, there is shown a layout of the apparatus for producing soybean flakes according to the present invention.

As shown in the drawing, this apparatus comprises an intermediate bin 12 into which the raw soybeans carried by a transfer means 10 such as a conveyor are charged, a pressure cooker 15 connected to the bottom of said intermediate bin 12 through a constant-feed rotary feeder 13 and an upper locker valve 14, a superheater 16 for forming superheated steam introduced into said pressure cooker 15 for cooking said raw soybeans, a roll mill 19 connected to the bottom of said pressure cooker 15 through a lower locker valve 17 and a deaerator 18, and a dryer/cooler unit 20 connected to said roll mill 19. All of these mechanisms are basically of known structures.

Figure 2A:
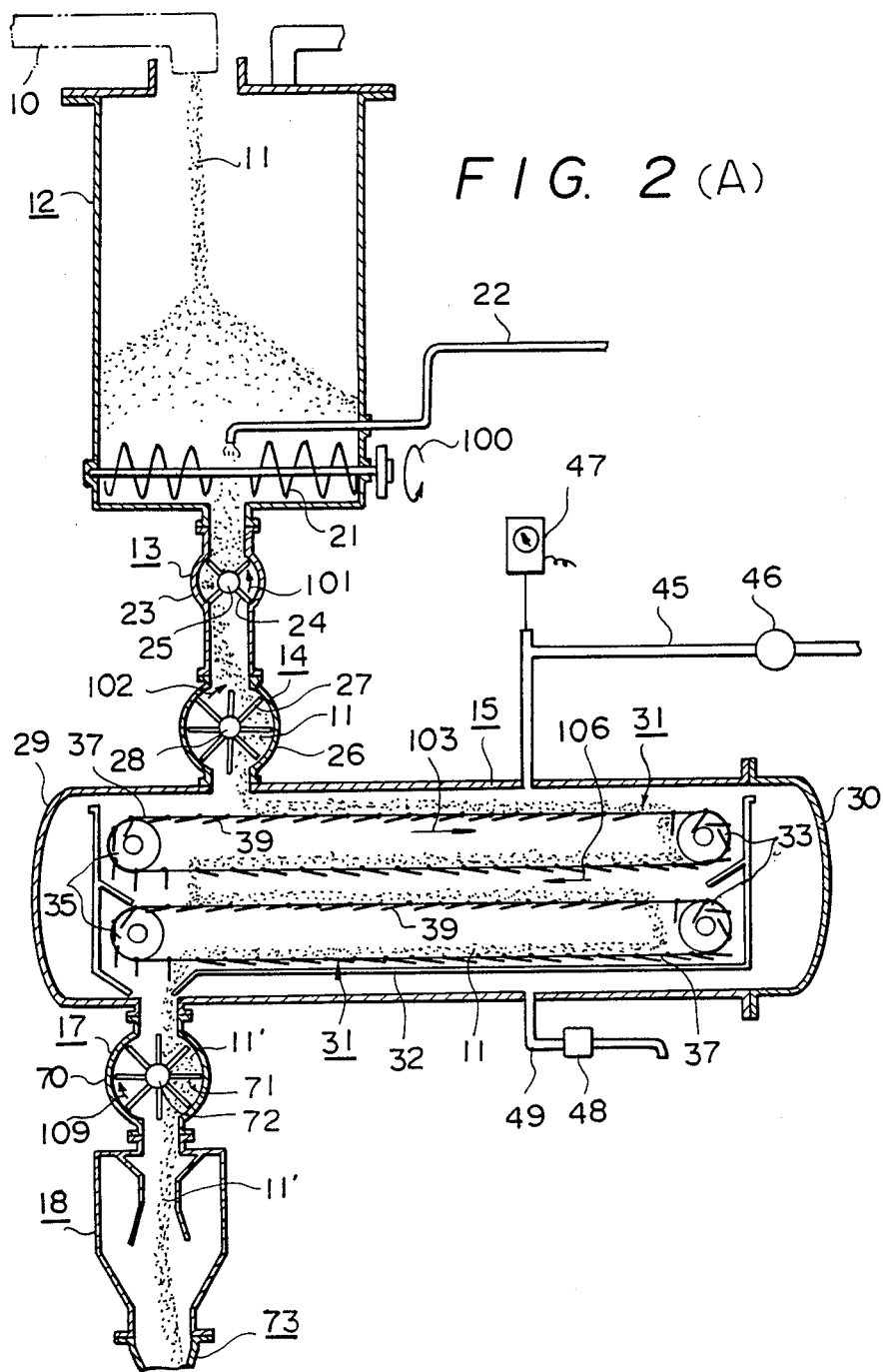
FIG. 2(A) is a schematic sectional view showing the mechanisms of the intermediate bin, the pressure cooker and the associated elements.
Figure 2:
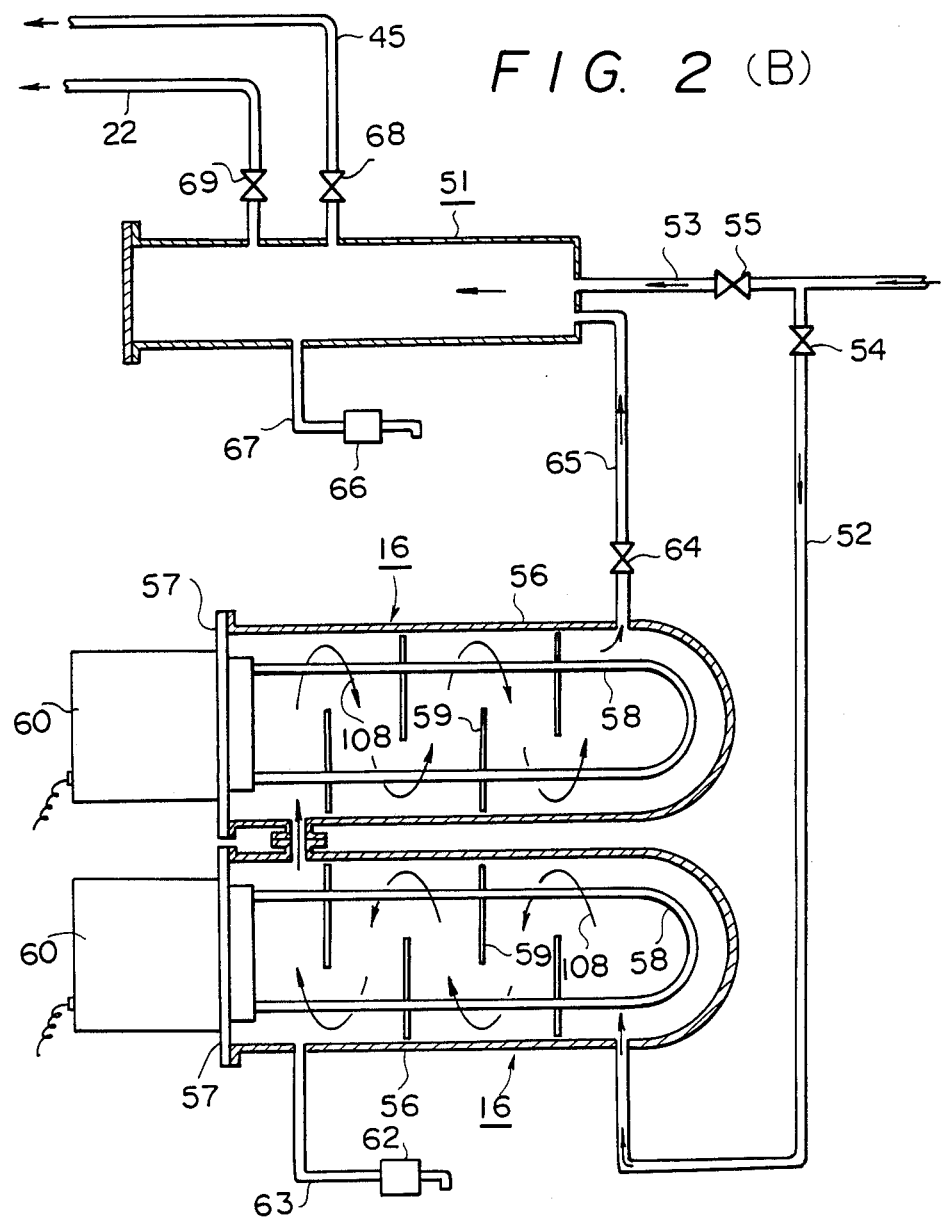
FIG. 2(B) is a schematic sectional view showing the mechanisms of the superheater, the steam header and the associated elements.
FIG. 2(C) is a schematic sectional view showing the mechanisms of the roll mill and the dryer/cooler unit.

As shown in FIG. 2(A), the intermediate bin 12 has a charging port and a discharging port of the raw soybeans 11, a steam outlet and a level gage (not shown). Toward the bottom of the bin is provided a screw conveyor 21 designed to be rotatable in the direction of arrow 100 so that the soybeans 11 accumulated in the bin are brought toward the center of the bottom of the bin from both sides.

Extending airtightly into the intermediate bin 12 is a steam pipe 22 connected to a steam header described later, and superheated steam is partly passed through said pipe 22 into the intermediate bin 12 for preheating the raw soybeans 11 therein.

The raw soybeans 11 in the intermediate bin 12 are brought toward the discharge port at the center of the bottom of the bin by the screw conveyor 21 and discharged out from said discharge port so that they are supplied into the pressure cooker 15 through the constant rotary feeder 13 and upper locker valve 14.

The constant rotary feeder 13 directly connecting to the discharge port of said intermediate bin 12 is designed to supply always a fixed amount of raw soybeans 11 to the locker valve 14. As shown in FIG. 2(A), said rotary feeder 13 comprises a rotor 25 having a plural number of blades 24 and rotatably disposed in a casing 23. As said rotor 25 rotates in the direction of arrow 101 at a controlled speed, the raw soybeans 11 are supplied at a fixed rate to the locker valve 14.

Said locker valve 14 is designed to continuously supply the raw soybeans 11 under the atmospheric pressure into the pressure cooker 15 described below. This valve also has the function to seal the back pressure in the cooker 15. As schematically illustrated in FIG. 2(A), said locker valve 14 comprises a rotor 28 rotatably disposed in a casing 26 and having a plurality of blades 27 whose ends are in close contact with the inner peripheral surface of the casing 26. As said rotor 28 rotates in the direction of arrow 102, the raw soybeans 11 are continuously supplied into the pressure cooker 15. Although not shown, a sealing vane made of a special alloy is provided in the recess of each blade 27 through a spring, and this sealing vane is tightly pressed against the inner peripheral surface of the casing 26 by dint of the elastic force of said spring to produce a sealing effect for preventing the pressurized steam from leaking to the outside of the casing.

The raw soybeans 11 supplied from said upper locker valve 14 into the pressure cooker 15 are efficiently cooked by superheated steam under pressure in said cooker 15, and in the course of this cooking, the toxic substances such as trypsin inhibitor contained in the soybeans are deactivated as they undergo wet heat denaturation while the smell peculiar to the beans is also eliminated.

Said pressure cooker 15 is a pressure vessel and, as schematically illustrated in FIG. 2(A), comprises a horizontal tubular casing 29 and a cover 30 airtightly joined to said casing 29 by a hinged bolt system that was employed for the easiness of opening and closing of the cover. In said cooker 15 is provided a two-stage soybean transfer mechanism.

Said transfer mechanism preferably comprises the slat chain conveyors 31 mounted in a casing 32, such conveyors being shown in detail in FIGS. 3 and 4.

As seen from these figures, there are provided a pair of chains 37 extending parallel to each other and passed round a pair of drive chain wheels 33 each having a boss 34 and a corresponding pair of follower chain wheels 35 each having a boss 36 (only one drive chain wheel and only one follower chain wheel are shown in FIG. 4). There are also provided a plurality of slats 39, each slat being pivotally mounted between every adjoining ones of a plurality of shafts 38 provided on the inside of said chains 37. Further, the square support plates 40 are provided at both ends of each slat 39 transversely thereto for holding the horizontal position of the slats 39.

As shown in FIGS. 3 and 4, along the forward passage of said chains 37 are provided a pair of upper guide plates 41 adapted such that the support plates 40 slide therealong to allow horizontal movement of the slats 39. Each of said guide plates 41 is so arranged that one end thereof is positioned in close adjacency to the bos8(bK 36 of the corresponding follower chain wheel 35 while the other end is located spaced-apart from the corresponding drive chain wheel 33. Along the return passage of the chains 37 are also provided a pair of lower guide plates 42 similar to said upper guide plates 41, with one end of each of said lower guide plates 42 being positioned slightly rearwardly of the corresponding drive chain wheel 33 while the other end being placed spaced-apart from the corresponping follower chain wheel 35. Further, at the position below said upper guide plates 41 and spaced a given distance from their other end, there is provided an inverted L-shaped check plate 43 with the end of its slightly longer horizontal plate portion being positioned closely adjacent to the boss 34 of the corresponding follower chain wheel 33. A similar check plate 44 is also provided at the position below said lower guide plates 42 and spaced a given distance from the other end thereof. Thus, as shown in FIGS. 2(A) and 4, when the chains 37 are driven to move forwardly, that is, in the direction of arrow 103 shown in said figures, with the rotation of said chain wheels 3, 35, the slats 39 on the upper side (along the forward passage of said chains) carrying the raw soybeans 11 supplied at a constant rate from said upper locker valve 14 through the opening of the casing 29 are caused to move in the same direction while maintaining the horizontal position as the support plates 40 slide along the upper surfaces of said upper guide plates 41. Upon passing the other end of said upper guide plates 41, each slat 39 turns in the direction of arrow 104 shown in FIG. 4 (the same action takes place with the slats of the lower-stage conveyor), whereby the soybeans 11 carried thereon are dumped onto a slat 39 on the return side. The slat 39 which turned runs onto the upper side of the check plate 43 and further moves thereon. On reaching the drive chain wheels 33, said slat 39 is guided by the bosses 34 of said chain wheels 33 and turn in the direction of arrow 105 shown in FIG. 4 with the rotation of said chain wheels 33 (the same action takes place with each slat in the lower-stage conveyor), and as the support plates 40 slide along the upper side of the lower guide plates 42, said slat 39 moves on (for a return trip) in the direction of arrow 106 in FIG. 4 while maintaining the horizontal position and carrying the soybeans 11 thereon. Upon passing the ends of the lower guide plates 42, said slat 39 makes a turn in the direction of arrow 107 in FIG. 4 and dumps the soybeans 11 thereon onto a slat in the slat chain conveyor 31 of the next stage, and then said slat 39 is guided by the bosses 36 of the follower chain wheels 35, runs onto the upper guide plates 41 and repeats the same movements as said above.

In this way, the soybeans 11 on the slats 39 move in the pressure cooker 15 while repeating the horizontal movement and turnover by the two-staged slat chain conveyors 31 and are oooked by superheated steam under pressure while they move.

Thus, the space in the pressure cooker 15 can be utilized to the maximum, and therefore the cooker 15 itself can be reduced in size.

The inside of the pressure cooker 15 is filled up with superheated steam supplied through a steam feed pipe 45, and the pressure in said cooker 15 can be freely controlled by adjusting a pressure-reducing valve 46 provided at an appropriate part of said steam feed pipe 45. For this purpose, a pressure gauge 47 is provided to said steam feed pipe 45. The pressure cooker 15 is also provided with a drain pipe 49 having a trap 48, a safety valve, a thermometer and other elements (now shown) necessary for the controlled operation of said pressure cooker 15.

The superheated steam filling the pressure cooker 15 is supplied in the following way. As shown in FIGS. 1 and 2(B), the saturated steam generated by a boiler 50 is passed through a superheater 16 and heated therein, and the superheated steam is led into a steam header 51, thence passed through the steam feed pipe 45 and introduced into the pressure cooker 15. This mechanism will be described more minutely below.

As seen from FIGS. 1 and 2(B), said boiler 50 is connected to said superheater 16 by a steam pipe 52 and also connected to said steam header 51 by a pipe 53 branching off said pipe 52, and stop valves 54 and 55 are provided at suitable positions halfway of the pipes 52 and 53, respectively.

The superheater 16 is preferably electric type and provided in two stages. As shown in FIG. 2(B), the superheater of each stage comprises a horizontal tubular casing 56, a blocking plate 57 airtightly bolted to the opening of said casing 56 so that said plate 57 is removable, a heating element 58 such as shielded nichrome wire disposed in said casing 56 and joined endwise to said blocking plate 57, baffles 59 secured to said heating element 58, and a terminal box 60 mounted on the outside of said blocking plate 57. The upper and lower superheaters 16 are airtightly connected to each other by the joint of the joining portions 61 of the respective casings 56. The lower superheater 16 is provided with a drain pipe 63 having a trap 62. Also, each superheater 16 is provided with appurtenant instruments such as thermometer although not shown in the drawings.

The saturated steam generated by and released from the boiler 50 passes through the steam pipe 52 and enters the lower superheater 16 and thence the upper superheater 16, in which said steam flows arcuately as shown by arrows 108 in FIG. 2(B), and as it flows in this way, it is efficiently heated by the action of baffles 59 to become superheated steam. The superheated steam flows out of the upper superheater 16 and passes through a stop valve 64 and a connecting pipe 65 to enter the steam header 51.

When the temperature of the superheated steam is set, the heating element 58 is automatically controlled so that the superheated steam of the setting temperature can be obtained.

As shown in FIG. 2(B), the steam header 51 is provided with a drain pipe 67 having a trap 66. Although not shown, it is also provided with a safety valve, a pressure gauge and a thermometer.

The superheated steam in the steam header 51 flows out therefrom and passes through a stop valve 68, steam feed pipe 45 and pressure-reducing valve 46 to enter the pressure cooker 15. A part of the superheated steam is led into the intermediate bin 12 through a stop valve 69 and steam pipe 22 and utilized for preheating of the raw soybeans 11 in the manner described above.

The soybeans 11' which have been cooked in said pressure cooker 15, with the toxic substances contained in the raw soybeans being deactivated and also with the bean smell eliminated, are discharged out from a discharge port at the bottom of the cooker and fall into the lower locker valve 17 connected to said discharge port.

Said lower locker valve 17 is of the same structure as the upper locker valve 14. As schematically illustrated in FIG. 2(A), it comprises a rotor 72 having a plural number of blades 71 each of which is in close contact at its end with the inner peripheral surface of a casing 70, and as said rotor 72 rotates in the direction of arrow 109, the soybeans 11' are supplied into a cylindrical deaerator 18.

In said deaerator 18, the steam which tagged along with the soybeans 11' is separated as it is sucked up by a fan (not shown), and the soybeans 11' freed of the steam are passed through a roll feeder 73 into a roll mill 19.

As schematically shown in FIG. 2(C), said roll feeder 73 comprises the bladed feed rolls 75, 76, 77 of different pitches in a casing 74, and said roll mill 19 comprises a pair of rollers 81, 82 rotated by drive motors 79, 80 (see FIG. 5) and housed in a casing 78. With rotation of said feed rolls 75, 76, 77, the soybeans 11' are supplied from the feeder onto the engaging portions of said pair of rollers 81, 82 uniformly along the full length of the rollers. As said pair of rollers 81, 82 rotate in the opposite directions, that is, in the directions of arrows 110 and 111, respectively, in FIG. 2(C), the soybeans 11' are squashed into flakes, and the thus formed soybean flakes 11" are led into a dryer/cooler unit 20.

The dryer/cooler unit 20, as schematically illustrated in FIG. 2(C), comprises a casing 83 the inside of which is comparted by a partition plate 84 into an upper drying chamber 85 and a lower cooling chamber 86. In the drying chamber 85 are provided the slat chain conveyors 87 arranged vertically in two stages, and in the cooling chamber 86 is provided a similar single-stage slat chain conveyor 88.

Since these slat chain conveyors 87, 88 are identical in structure with the slat chain conveyors 31 provided in the pressure cooker 15 described above, no further explanation of said conveyors 87, 88 is given here.

The soybean flakes 11" supplied into the dryer/cooler unit 20 are first carried on the slat chain conveyor 87 of the upper stage to move in the direction of arrow 112 and then, after turned at the end of the conveyor, further move in the direction of arrow 113 as shown in FIG. 2(C). The same movement is repeated on the slat chain conveyor 87 of the lower stage. While the soybean flakes 11" are carried on the slat chain conveyors 87 in this manner, they are dehumidified by the hot air of 80° C. or higher blown into the drying chamber 85 from a hot air inlet 89. Then the flakes make their way into the cooling chamber 86 through a feeder 90. In the cooling chamber 86, the flakes are carried on the slat chain conveyor 88 to move first in the direction of arrow 114 and then, after turned at the end of the conveyor, further move in the direction of arrow 115, and while they move in this way in the cooling chamber 86, they are cooled down to room temperature by the air introduced into the cooling chamber from an air inlet 91 and let out from an air outlet 92. The cooled flakes are taken out as the final product soybean flakes from the discharge port at the bottom of the casing 83 and transferred out of the system by a transfer means 93.

Hot air drying and air cooling are effected by forced draft by the operation of the respective fans not shown. Said pressure cooker and other units are disposed on the floor boards of the respective floors in a frame structure.

Figure 5:
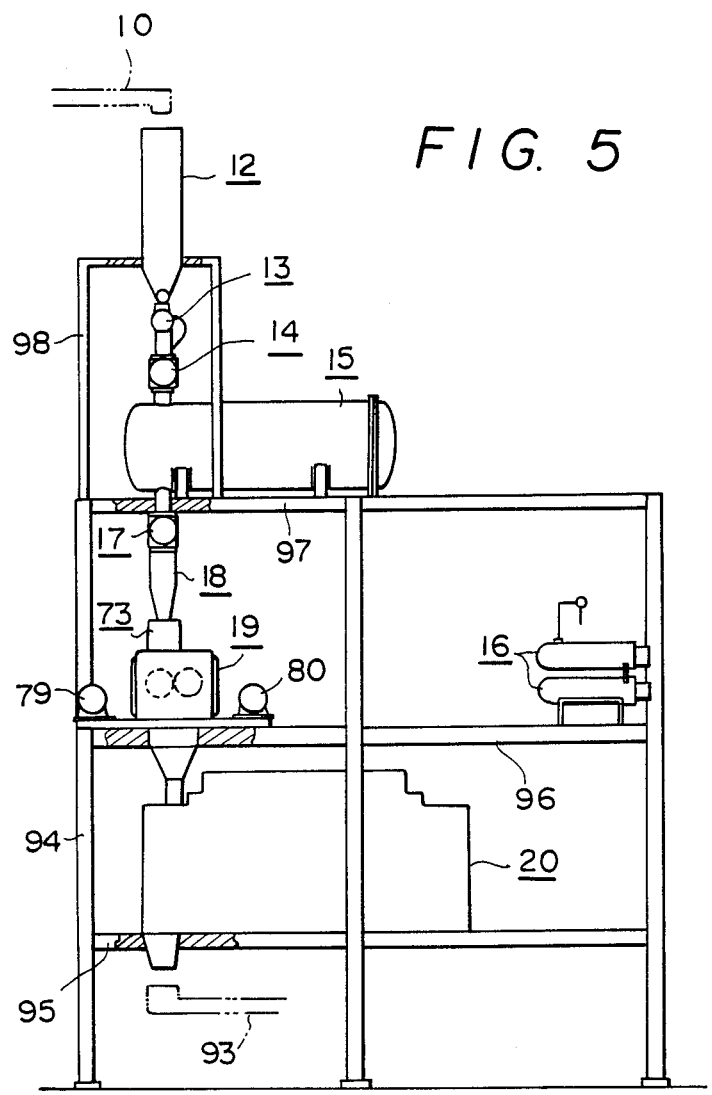
FIG. 5 is a schematic frontal view of the apparatus according to this invention.
Figure 6:
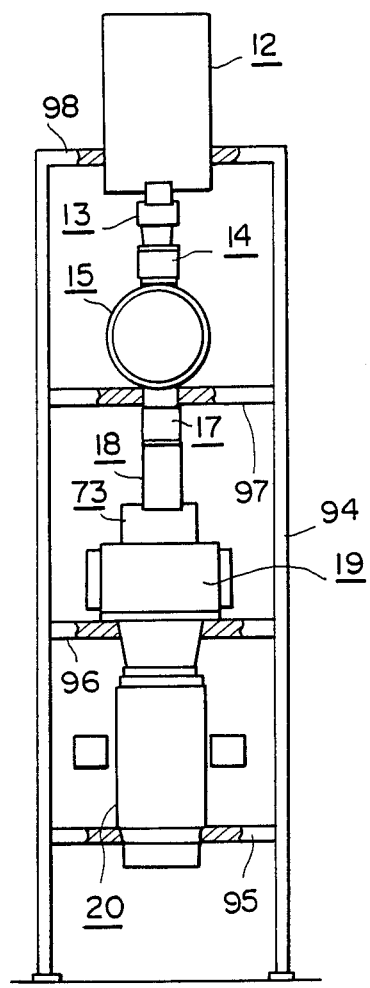
FIG. 6 is a schematic side view thereof.

As shown in FIGS. 5 and 6, the dryer/cooler unit 20 is disposed on the floor board 95 of the second floor of the frame structure 94, while the roll mill 19, superheater 16 and steam header 51 are disposed on the floor board 96 of the third floor. The pressure cooker 15 is mounted on the floor board 97 of the fourth floor, and the bin 12 is supported by the support legs 98 set upright astriding the pressure cooker 15 on the frame structure 94.

The preferred embodiment of this invention described above operates as follows.

The raw soybeans 11 carried on the conveyor means 10 and charged into the intermediate bin 12 are brought toward the opening at the center of the bottom thereof by the screw conveyor 21, discharged out from said opening, passed through the constant-feed rotary feeder 13 and the upper locker valve 14 and supplied at a constant rate onto the slat chain conveyor 31 in the pressure cooker 15.

The inside of the pressure cooker 15 is filled with superheated steam so that the raw soybeans 11 supplied thereinto are heated and moistened in the atmosphere of said superheated steam under pressure and thereby cooked in the pressure cooker 15.

The saturated steam generated by the boiler 50 is passed through the steam pipe 52 and stop valve 54 to enter the superheater 16 (the stop valve 55 is kept closed to inhibit the saturated steam from entering the steam header 51). In said superheater 16, the saturated steam is heated to become superheated steam, and this superheated steam is passed through the stop valve 64 and connecting pipe 65 to enter the steam header 51 whence the superheated steam is further passed through the stop valve 68, steam conduit 45 and pressure-reducing valve 46 and introduced into the pressure cooker 15. On the other hand, the raw soybeans 11 supplied into the pressure cooker 15 move in the cooker while repeating the horizontal movement and turnover as they are carried on the slat chain conveyors 31 of two vertical stages provided in said cooker 15, and while moving in this way, they are cooked with superheated steam in the cooker. For arresting the rise of water content of the soybeans and for effecting the desired deactivation of the toxic substances contained in the soybeans and the elimination of the bean smell, the cooking is conducted under the following conditions: pressure in the cooker: 0.5 to 0.7 $kg/cm^2G$, preferably 0.5 $kg/cm^2G$; temperature: 125° to 130° C., preferably 125° C.; residence time in the cooker: 2 to 3 minutes, preferably 2 minutes.

If the pressure in the cooker is below 0.5 $kg/cm^2G$, the temperature is below 125° C. and the residence time is less than 2 minutes, the toxic substances contained in the soybeans are not sufficiently deactivated and also the bean smell is not perfectly eliminated. Also, because of insufficient heating and moistening, the soybeans when subjected to the roll mill are fructured and can not be made into flakes.

Also, in case the pressure in the cooker is over 0.7 $kg/cm^2G$, the temperature is higher than 130° C. and the residence time is longer than 3 minutes, although the toxic substances are deactivated and the bean smell is eliminated, the water content of the soybeans increases so that the soybean become sticky to the rollers when they are worked by the roll mill, and no soybean flakes of good quality can be obtained.

The soybeans 11' which have been properly cooked under said conditions in the pressure cooker 15, with the toxic substances contained therein being deactivated and the bean smell eliminated and also with the water content being maintained properly, are discharged out from the cooker 15 and led into the deaerator 18 through the lower locker valve 17. In said deaerator 18, the steam clinging to the soybeans 11' is separated, and the steam-freed soybeans 11' are passed through the roll feeder 73 and supplied onto a pair of rollers 81, 82 of the roll mill 19 uniformly along the full length of said rollers. As said rollers 81, 82 rotate, the soybeans 11' are pressed therebetween and flattened into flakes.

When the soybeans are squashed by said rollers, they are neither broken nor become sticky and also remain safe from peel of the epidermis because of the proper water content, and thus they are favorably squashed into flakes. Further, since the soybeans and squashed in a properly softened state, their flaking can be accomplished economically with a low power consumption.

The thus formed soybean flakes 11" are then led into the dryer/cooler unit 20 where they are first dried with hot air in the upper drying chamber 85 as they move therein while carried on the two-stage slat chain conveyors 87 by repeating horizontal movement and turnover, and then cooled with air in the lower cooling chamber 86 where the flakes make the same movement on the slat chain conveyor 88, and the thus treated flakes are taken out as the final product by the transfer means 93.

Drying and cooling of the flakes in said dryer/cooler unit 20 are also effected economically with a low power consumption since the flakes are in a properly softened state.

In case of producing the flakes for stock feed by using other cereals than soybean, such as wheet, corn, etc., the stop valves 54 and 64 are closed while the stop valve 55 is opened so that the saturated steam generated by the boiler 50 will be entirely passed into the steam header 51 through the branch pipe 53, and this saturated steam is further passed through the conduit 45 into the pressure cooker 15 so that the cooker is filled with said saturated steam, and the cereals are cooked with the saturated steam under pressure in said cooker 15, whereby the starch of said cereals can be efficiently turned into α starch. The cooked cereals are then made into flakes by the roll mill 19 and then dried and cooled by the dryer/cooler unit 20. It is thereby possible to produce the high-quality flakes of corn and other cereals.

What we claim is:

1. An apparatus for producing soybean flakes, comprising an intermediate bin having a charge port and a discharge port of raw soybeans and provided with a rotatable screw conveyor close to said discharge port, said screw conveyor being designed to bring the accumulated raw soybeans in the bind toward the center of the bottom thereof from both sides, a pressure cooker connected to said discharge port of said intermediate bin through a constant rotary feeder and an upper locker valve capable of pressure seal, said pressure cooker having provided therein slat chain conveyors by which the raw soybeans supplied thereonto through said upper locker valve are carried horizontally and turned over so that they are cooked with superheated steam under pressure while carried on said conveyors in said cooker, a superheater for producing superheated steam by heating saturated steam from a boiler, a steam header connected to said superheater through a pipe and also connected to said boiler through a pipe, said steam header being adapted to introduce superheated steam produced by said superheater into said pressure cooker and said intermediate bin through respective pipes, a deaerator connected to the discharge port of said pressure cooker through a lower locker valve capable of pressure seal, in which deaerator the steam tagging on to the soybeans discharged through said lower locker valve is separated, a roll mill for squashing the cooked soybeans into flakes, said roll mill being connected to said deaerator, and a dryer/cooler unit connected to said roll mill and comprising an upper drying chamber in which said soybean flakes carried on the conveyors are dried with hot air and a lower cooling chamber where the dried soybean flakes are cooled with air while carried on a conveyor.

* * * * *